July 27, 1926.

R. STRESAU

RIGID FRAME FOR MOTOR VEHICLES

Filed March 30, 1922

1,593,783

WITNESS:

INVENTOR:
Richard Stresau.
BY:

ATTORNEYS

Patented July 27, 1926.

1,593,783

UNITED STATES PATENT OFFICE.

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK.

RIGID FRAME FOR MOTOR VEHICLES.

Application filed March 30, 1922. Serial No. 547,964.

The invention relates to the frame of an automobile or other vehicle, and is designed to eliminate the feature of flexibility inherent to the construction of frames of the usual type, in which the pressed steel channel side bars are connected by similarly formed cross bars.

In frames of the older type, that is, frames constructed as above described, it is impossible to maintain the side bars in a common plane, when the automobile is subjected to unevenly distributed loads, or is operating over uneven road surfaces. The channel side bars and the like cross bars are flexible by reason of the nature of their construction, and as a consequence a frame so formed will twist or weave, and the side bars will rock one with relation to the other from the plane in which it is best that they should be preserved at all times.

The unfavorable conditions arising from this weaving action of the frame in straining and disarranging the parts supported thereon, are well known. It is the purpose of my invention to overcome the adverse conditions referred to, and I achieve this result by improving the construction of the frame in such manner that for all practical purposes it is made substantially rigid, so that the side bars are maintained in a common plane at all times, and are not caused to depart therefrom by unevenly distributed loads imposed upon the body of the vehicle, or by reason of bad road surfaces.

In constructing my improved frame, I employ the usual pressed steel channel side bars, which are preferable to other forms for various well known reasons, and replace the usual similarly formed connecting cross bars, by tubular cross bars, the latter constituting torsion resisting members which, when properly connected at their ends to the channel side bars to produce a permanent structure, serve to maintain the side bars in a common plane, and contribute to the rigidity of the frame, so that the side bars cannot be rocked one with relation to the other. As a consequence of this new arrangement, the frame of the automobile does not weave or twist under the unfavorable conditions referred to, and racking of the structure supported upon the frame is obviated.

My invention relates particularly to the manner of effecting the connection between the torsion resisting tubular members constituting the cross bars and the pressed channels constituting the side bars, whereby what is practically a rigid structure in frames of the class described is achieved.

In carrying out my invention, I apply to each end of the torsion resisting tubular cross bar, an end plate or shoe in the form of a channel member, which extends transversely of the axis of the tubular cross bar and is secured thereto by arc welding at a plurality of points, whereby the metals are fused together and there is effected a complete union of the parts into an integral structure. The union thus produced has such a degree of strength that all shearing strains in the welded areas under conditions which tend to twist the frame in which the tubular cross bars have been incorporated as structural elements are more widely distributed and are successfully resisted.

Although I may weld through the flanges of the end plate or shoe so as to fuse the metals of the parts into an integral structure, I find the operation may be quickened by forming openings or perforations in the flanges, so that the arcing current may play directly upon the tube through the said openings and effect fusion of the tube and edges of the opening in the flange more economically and with less consumption of current. In the fusion of the adjacent areas of the metals, such openings in the flanges are filled by the molten metal flowing from the fusible weldrod, and this additional metal uniting with the tube and filling the opening, constitutes a key formed integrally upon and which effectively locks the tubular member against any rotation with relation to the end plate or shoe. By providing a long slot transversely of the flange, the resistance to torsional stresses is correspondingly increased, by reason of the distribution of the strains over a more extended or lengthened area.

The end plates or shoes referred to are somewhat elongated in proportion to the diameter of the tubular member, so as to constitute a good leverage, and thus resist the shearing strains which are imposed upon the rivets which are set at a distance from the tubular member and which are used to unite the said plates or shoes to the vertical webs of the flanged side bars. The elongated end plates have an engagement with the flanges of the channel side bars and in this manner the shearing strain upon the rivets is further lessened.

The provisions of construction just described enable me to produce a frame possessing the very desirable quality of rigidity, and this result I achieve without sacrificing the strength of the frame in any respect, inasmuch as it is not necessary to perforate the flanges of the side bars to make a riveted connection between such bars and the cross bars of the frame.

The novel features of my invention will be pointed out in the appended claims.

In the accompanying drawing:—

Figure 1:
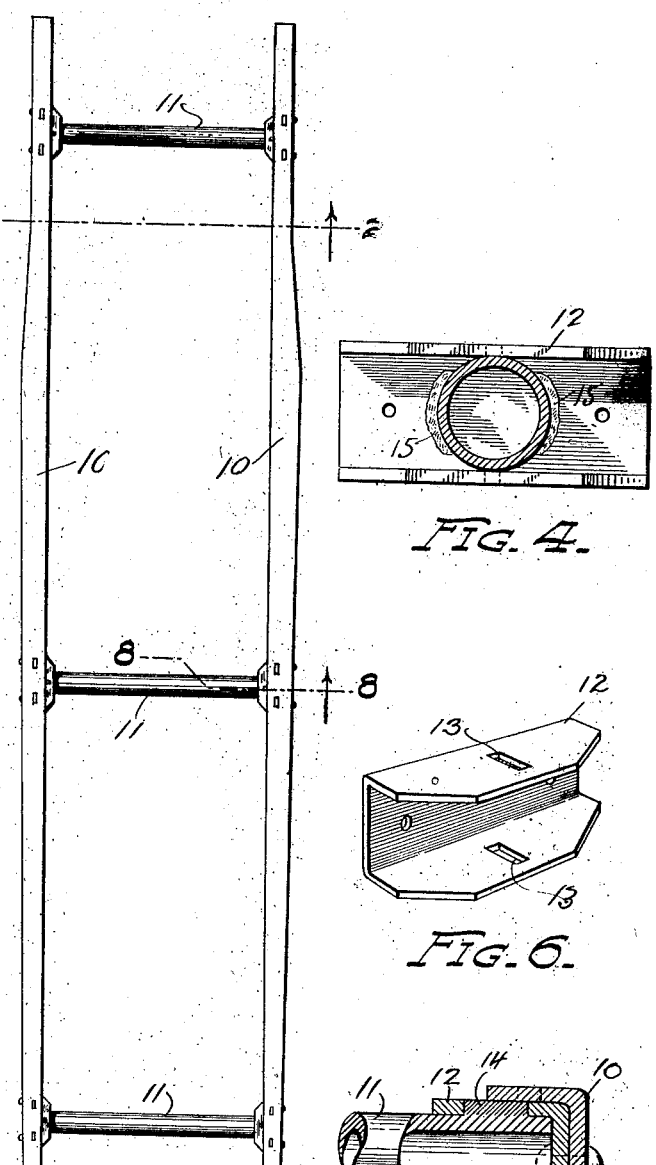
Figure 1 is a plan view of an automobile frame embodying my invention.
Figure 3:
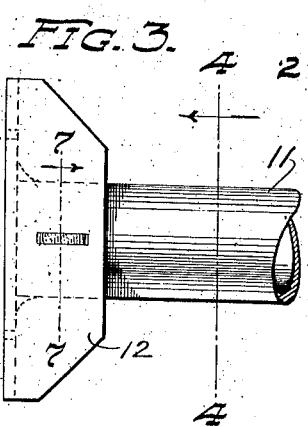
Fig. 3 is an enlarged view in plan showing one end of a torsion resisting tubular cross bar, together with the side bar connecting plate or shoe as secured to the cross bar in accordance with my invention.
Figure 4:
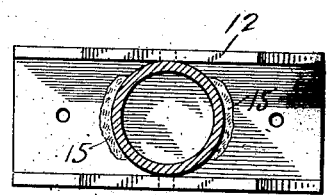
Fig. 4 is a view in elevation on the section line 4—4, Fig. 3, looking in the direction of the arrow toward the interior of the shoe.
Figure 5:
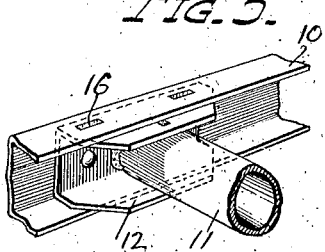
Fig. 5 is a perspective view showing one end of the torsion resisting tubular cross bar and its end plate or shoe assembled with relation to the channel side bar, a section of the latter being shown.
Figure 6:
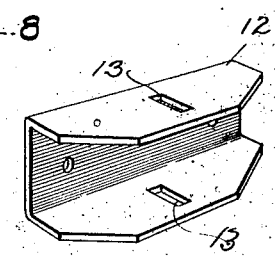
Fig. 6 is a perspective view, similar to Fig. 5, showing the flanged formation of the end plate or shoe which is employed as a means for attaching the torsion resisting tubular cross bar to the channel side bar.
Figure 7:
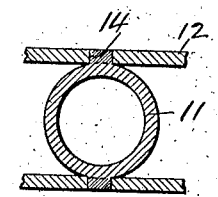
Fig. 7 is a vertical section on the line 7—7, Fig. 3, looking in the direction of the arrow, and showing the preferred manner of welding the end plate or shoe to the tubular cross bar.

Referring to the drawing, Fig. 1, the numerals 10 indicate the opposed pressed steel channel side bars of an automobile or other vehicle frame, the said side bars being spaced apart by cross bars 11, which latter are connected at their ends to the side bars in such manner as to form a fixed and permanent structure. The cross bars will be in such number as to meet the requirements of the particular frame which it is desired to manufacture.

Figure 2:
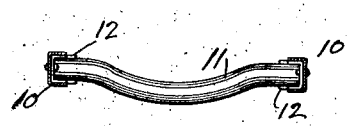
Fig. 2 is a view in elevation on the section line 2—2, Fig. 1, looking in the direction of the arrow, and showing the formation of a curved tubular torsion resisting cross bar at the front end of the frame.
Figure 8:
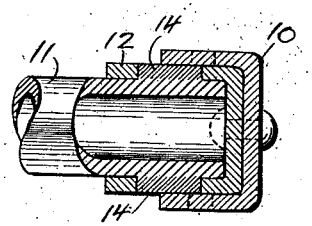
Fig. 8 is an enlarged vertical section on the line 8—8, Fig. 1, looking in the direction of the arrow, and showing the manner of assembling the elements of the frame in accordance with my invention.

In my improved construction, the cross bars 11 constituting the torsion resisting members of the frame, are formed as tubes and may be straight, or curved as indicated in Fig. 2, and of such length as to produce the desired width of the frame in which they are incorporated. The channel side bars 10 may extend in parallel vertical planes, or may converge at their forward ends, or be otherwise arranged as desired, the length of such bars being determined by the requirements of the particular construction of frame.

The end plate or shoe 12, pressed into channel shape from a blank of sheet metal, is permanently united to the tubular cross bar, one at each end, in such manner as to form an integral structure. The laterally projecting flanges of the end plate or shoe 12 are separated a distance which is equal to the diameter of the tubular cross bar 11. Such flanges are provided with elongated openings 13, which extend in parallelism with the axis of the tubular cross bar. The end of the tubular cross bar 11 is inserted between the flanges of the shoe end plate or shoe 12, with the opposite openings 13 in coincidence with the axis of the cross bar, and with the end of the latter abutting the web of the said plate or shoe.

In uniting the end plates or shoes 12 to the cross bars 11, I employ the arc welding process. The electric current may be conducted to the work by means of a fusible weldrod which fuses the metals of the parts 11 and 12 in the vicinity of the openings 13, and which at the same time deposits molten metal flowing from the weldrod, so as to fill the openings 13, and effect a complete union between the parts. The welded line thus formed has an appreciable length, and the fusion of the metals thus effected is productive of a joint of great strength which embraces a considerable area of the two parts. As a result, any shearing strains to which the joint may be subjected, are distributed to so great an extent that ample resistance to any such strains is created. Tests have demonstrated that the union joining the parts is such that the metal of the shoe 12 will be crumpled and torn without breaking the joint.

I may augment the described method of uniting the cross bars and end plates or shoes, by further welding the parts at the points of contact of the end faces of the tube with the vertical web of the end plate or shoe. This line of welding, which is indicated at 15, partially encircles the tube so as to effect fusion of the metals at the points last indicated.

When manufactured in the manner described, the torsion resisting tubular cross bars are provided at their ends with integral means for attaching the cross bars to the side bars.

The width of the plate or shoe 12 may be such that its flanges will be seated snugly between the flanges of the side bar 10. Connection between the end plate or shoe 12 and the side bar may be effected by means of rivets passing through the vertical webs of the parts 10 and 12. It is advisable that the length of the end plate or shoe be of such extent that a considerable leverage between the torsion resisting tubular cross bar and the rivets connecting the part to the side bar will be provided, so that the shearing strain upon such rivets will be resisted and overcome. In addition, the engagement of the flanges when the parts are nested one within the other in the manner shown and described, serves to further distribute the strains and in a greater degree establish a resistance to any twisting forces to which the frame may be subjected by reason of the conditions hereinbefore described.

The laterally extending flanges of the channel side bars 10, serve as tension and compression members, the strength of which is lessened by perforations in such flanges for the accommodation of rivets, in the usual process of manufacturing frames. It is my desire to avoid perforating the flanges of the side bars for the usual rivets, and I may unite the flanges of the end plate or shoe 12 to the flanges of the side bar 10, by welding through openings 16 in the flanges of the side bar. This will permit the effective fusion of the metals of the adjacent parts, and at the same time such openings will be filled by molten metal flowing from the fusible weldrod employed to conduct the welding current. The fusion of the metals and accretion by the deposit of molten metal made by the weldrod, restores the integrity of the flanges of the side bar, so that the latter is not weakened in any degree. It is obvious that instead of perforating the flanges of the side bar as at 15, and welding in the manner described, spot welding of the contiguous flanges of the shoe and side bar at the desired points may be resorted to.

The abutting engagement of the end of the tubular cross bar with the web of the end plate 12, with the parts welded in the manner described, prevents any rocking movement of the cross bar in the longitudinal plane of the frame. Consequently longitudinal movement of one side bar with relation to the other is prevented. The diameter of the tube used for the cross bar determines the leverage afforded by the radius of the cross bar at the opposite connecting points between the end of the cross bar and the web of the end plate. By using tubes of larger diameter, a greater degree of rigidity in the particular mentioned is attained.

The steps which are performed in carrying my invention into practice, enable me to produce a vehicle frame in which the means employed for connecting the ends of the tubular cross bars to the channel side bars are constituted as an integral part of the cross bars, so that any shearing strains at the points of connection are successfully resisted and overcome, and a practical rigidity of the frame is secured through the torsion resisting cross bars. The resistances created by my improved construction serve to maintain the frame substantially free from any vertical twisting or rocking tendencies, or longitudinal racking, such as have heretofore proven very objectionable. Such tendencies are practically overcome by reduction to a negligible quantity.

Having thus described my invention, what I claim and desire to secure by Letters Patent of the United States, is:—

1. In a vehicle frame, the combination of channel side bars, torsion resisting tubular cross bars extended between the said side bars, with means upon the ends of the cross bars for connecting the cross bars to the side bars to constitute the frame, the said means comprising plates or shoes having flanges between which the ends of the cross bars are entered and joined thereto by welding through the flanges.

2. In a vehicle frame, the combination of channel side bars, torsion resisting tubular cross bars extended between the said side bars, with means upon the ends of the cross bars for connecting the cross bars to the side bars to constitute the frame, the said means comprising plates or shoes having flanges between which the ends of the cross bars are entered and joined thereto by welding on lines coincident with the axis of the cross bar.

3. In a vehicle frame, the combination of channel side bars, torsion resisting tubular cross bars extended between the said side bars, with means upon the ends of the cross bars for connecting the cross bars to the side bars to constitute the frame, the said means comprising plates or shoes having a web and projecting flanges between which latter the ends of the cross bars are entered in abutting relation to the web, and joined by welding through the flanges.

4. In a vehicle frame, the combination of channel side bars, torsion resisting tubular cross bars extended between the said side bars, with means upon the ends of the cross bars for connecting the cross bars to the side bars to constitute the frame, the said means comprising plates or shoes having a web and projecting flanges between which latter the ends of the tubular cross bars are entered in abutting relation to the web, and joined by welding through the flanges longitudinally of the cross bars and to the web circumferentially of the cross bars.

5. In a vehicle frame, the combination of channel side bars, torsion resisting tubular cross bars extended between the said side bars, with means upon the ends of the cross bars for connecting the cross bars to the side bars to constitute the frame, the said means comprising end pieces disposed transversely to the axis of the cross bar and embracing the latter, and welded thereto on lines longitudinally of the cross bar, and with the said end pieces engaging the flanges of the channel side bars.

6. In a vehicle frame, the combination of channel side bars, torsion resisting tubular cross bars extended between the said side bars, with means upon the ends of the cross bars for connecting the cross bars to the side bars to constitute the frame, the said means comprising end plates with laterally projecting flanges between which the ends of the tubular cross bars are entered and welded together at the opposite lines of engagement of the tubular cross bar with the said flanges.

7. A constructional element for a vehicle frame, comprising a torsion resisting tubular cross bar and an end piece integrally united thereto, the said end piece being formed as a channel member with projecting flanges which embrace the end of the cross bar, and the said flanges being provided with openings coincident with the cross bar and through which the welding of the parts is effected.

8. An integrally formed constructional element for a vehicle frame, the said element comprising a flanged end plate or shoe and a tubular torsion resisting cross bar, the flanges of the plate or shoe being provided with openings in conjunction with which the end of the cross bar is associated, and the parts being welded together in the area of the said openings.

9. An integrally formed constructional element for a vehicle frame, the said element comprising a flanged end plate or shoe provided with separated flanges and a tubular torsion resisting cross bar entered between the flanges of the end plate or shoe and welded thereto in the longitudinal direction of the cross bar.

10. An integrally formed constructional element for a vehicle frame, the said element comprising a tubular torsion resisting cross bar and a flanged end plate or shoe provided with separated flanges between which the end of the cross bar is entered and welded thereto through the flanges of the end plate or shoe.

11. An integrally formed constructional element for a vehicle frame, the said element comprising a tubular torsion resisting cross bar and a flanged end plate or shoe provided with separated flanges between which the end of the cross bar is entered and welded thereto.

In testimony whereof, I have signed my name at Milwaukee, this 27th day of March, 1922.

R. STRESAU.